United States Patent
Zhao

(10) Patent No.: US 9,736,800 B2
(45) Date of Patent: Aug. 15, 2017

(54) METHOD OF SYNCHRONIZATION AND DETECTION FOR A MULTI-STATION WIRELESS COMMUNICATION SYSTEM (WIFI), AND WIRELESS COMMUNICATION SYSTEM UTILIZING THIS METHOD

(71) Applicant: COMSIS, Paris (FR)

(72) Inventor: Zhipeng Zhao, Paris (FR)

(73) Assignee: COMSIS, Paris (FR)

( * ) Notice: Subject to any disclaimer, the term of this patent is extended or adjusted under 35 U.S.C. 154(b) by 60 days.

(21) Appl. No.: 14/389,057

(22) PCT Filed: Mar. 21, 2013

(86) PCT No.: PCT/EP2013/055896
§ 371 (c)(1),
(2) Date: Sep. 29, 2014

(87) PCT Pub. No.: WO2013/143959
PCT Pub. Date: Oct. 3, 2013

(65) Prior Publication Data
US 2015/0085837 A1    Mar. 26, 2015

(30) Foreign Application Priority Data
Mar. 29, 2012  (FR) ..................... 12 52841

(51) Int. Cl.
*H04J 3/00* (2006.01)
*H04W 56/00* (2009.01)
(Continued)

(52) U.S. Cl.
CPC ....... *H04W 56/001* (2013.01); *H04J 13/0003* (2013.01); *H04L 27/2613* (2013.01); *H04J 2013/0096* (2013.01); *H04W 84/12* (2013.01)

(58) Field of Classification Search
None
See application file for complete search history.

(56) References Cited

U.S. PATENT DOCUMENTS 5,991,308 A * 11/1999 Fuhrmann ........... H03M 13/256
348/E7.07
7,263,119 B1 * 8/2007 Hsu ................... H04L 25/03057
375/148

(Continued)

OTHER PUBLICATIONS

Ali Tawfiq et al, "Cyclic Orthogonal Codes in CDMA-Based Asynchronous Wireless Body Area Networks", Proceedings of IEEE International Conference on Acoustics Speech and Signal Processing, Mar. 25, 2012, pp. 1593-1596.

*Primary Examiner* — Michael J Moore, Jr.
(74) *Attorney, Agent, or Firm* — Greer, Burns & Crain, Ltd.

(57) ABSTRACT

A method is provided for detection and synchronization for a multistation wireless communication system (WiFi) implementing a layer, termed the MAC or Medium Access Control layer, provided for implementing a multiple access protocol and a physical layer, termed the PHY or Physical Layer, provided for achieving synchronization and detection functions, the MAC layer transmitting commands to the PHY layer so as to carry out the multiple access protocol and the PHY layer generating in response at least one waveform carrying synchronization signals and detection signals, the MAC layer implements an orthogonal or quasi-orthogonal cyclic signal to construct the at least one waveform.

14 Claims, 1 Drawing Sheet

(51) Int. Cl.
*H04L 27/26* (2006.01)
*H04J 13/00* (2011.01)
*H04W 84/12* (2009.01)

(56) References Cited

U.S. PATENT DOCUMENTS

| | | | |
|---|---|---|---|
| 2003/0156603 A1 | 8/2003 | Rakib et al. | |
| 2004/0146091 A1* | 7/2004 | Chang | H04B 1/70755 375/147 |
| 2006/0034233 A1* | 2/2006 | Strutt | H04L 45/123 370/338 |
| 2007/0110055 A1* | 5/2007 | Fischer | H04L 47/10 370/389 |
| 2008/0170551 A1* | 7/2008 | Zaks | H04W 52/0229 370/338 |
| 2008/0181155 A1* | 7/2008 | Sherman | H04W 52/0229 370/311 |
| 2008/0259957 A1* | 10/2008 | Kliger | H04L 12/2805 370/469 |
| 2009/0132742 A1* | 5/2009 | Simmons | H04L 49/40 710/106 |
| 2009/0168848 A1* | 7/2009 | Constantinidis | H04B 1/707 375/140 |
| 2014/0003819 A1* | 1/2014 | Cho | H04W 72/04 398/96 |
| 2015/0045016 A1* | 2/2015 | Xiong | H04W 8/005 455/426.1 |

\* cited by examiner

METHOD OF SYNCHRONIZATION AND DETECTION FOR A MULTI-STATION WIRELESS COMMUNICATION SYSTEM (WIFI), AND WIRELESS COMMUNICATION SYSTEM UTILIZING THIS METHOD

BACKGROUND

The present invention relates to the use of a particular waveform improving the detection and synchronization performance within the context of a WiFi network. This waveform allows a satisfactory compromise to be reached between the performance and the complexity of utilization of this detection.

WiFi wireless communication takes place on the layer known as PHY layer ("Physical Layer"). The PHY layer provides the support for reliable data transmission.

The MAC layer ("Medium Access Control Layer"), is responsible for managing transmission/reception in the context of multi-stations.

In a WiFi network, the MAC layer comprises a protocol for coordinating access to the radio resource which is based on the CSMA/CA ("Carrier Sense Multiple Access with Collision Avoidance") protocol. This mechanism takes account of the fact that each station operates in "half-duplex" mode, i.e. it cannot listen and transmit at the same time. According to the CSMA/CA protocol, a station starts by listening on the channel for a random duration when it needs to send data packets. When the channel is free, the station sends its frame. If the channel is not free, the station waits for the next interval to send its data packets. The duration of listening is a random multiple of the time interval known as a "timeslot".

The purpose of the present invention is to propose a method of synchronization and detection which is more efficient and more robust than the current methods.

SUMMARY

This objective is achieved with a method of synchronization and detection for a mufti-station wireless communication system (WiFi) utilizing a layer known as a MAC layer ("Medium Access Control Layer"), provided for implementing a multiple-access protocol and a "Physical Layer", known as PHY layer, provided in order to achieve the functions of synchronization and detection,
the MAC layer transmitting to the PHY layer commands for realizing said multiple-access protocol and the PHY layer generating in response at least one waveform x(t) carrying synchronization signals and detection signals.

According to the invention, this method of synchronization and detection utilizes an orthogonal or quasi-orthogonal cyclic signal s(t) for constructing said at least one waveform x(t).

In a preferred embodiment of the invention, the synchronization signals include a cyclic prefix, the orthogonal or quasi-orthogonal cyclic signal and a cyclic suffix.

The detection signals can advantageously include a repetition of the orthogonal or quasi-orthogonal cyclic signal, for example a repetition of Barker codes.

The specific waveform utilized in the synchronization and detection method preferably has a substantially constant amplitude.

The waveform having substantially constant amplitude is for example generated by PSK ("Phase Shift Keying") modulation and preferably by BPSK ("Binary Phase Shift Keying") modulation.

The orthogonal or quasi-orthogonal cyclic signal can be generated from a pseudo-random binary sequence according to $$s_n = (-1)^{a_n},\ 0 \leq n \leq N-1$$

where $\{a_n\}$ is a binary sequence of size N.

The waveform corresponding to the synchronization signal can be generated by using an m-sequence, i.e. a periodic sequence of values produced by a linear feedback shift register (LFSR).

The cyclic prefix can advantageously be arranged to control an automatic gain controller (AGC).

In a practical embodiment of the method according to the invention, the latter also utilizes an intermediate layer (Qos-WiFi) provided to cooperate with the MAC layer for transmitting commands to the physical layer PHY.

The orthogonal or quasi-orthogonal signal can be of the type $$\bar{s} = (s_0, \ldots, s_{N-1})$$

having a length N which verifies:

$$\begin{cases} E(\bar{s}) = \dfrac{1}{N}\sum_{i=0}^{N-1} s_i = \epsilon \\ A(\bar{s}, t) = \dfrac{1}{N}\sum_{i=0}^{N-1} s_i s_{i+t}^* = f(t) \end{cases}$$

where E is the expected value of the signal and $A(\bar{s}, t)$ is the autocorrelation function of the signal and $$\epsilon = 0 \text{ or } \epsilon \approx 0 \text{ and } f = \delta \text{ or } f \approx \delta$$

where $\delta$ is a Dirac impulse such that $$\delta(t) = \begin{cases} 1, & t = 0 \\ 0, & t \neq 0 \end{cases}.$$

The method of synchronization and detection can be utilized in order to implement a multiple-access mechanism of the CSMA/CD ("Carrier Sense Multiple Access with Collision Detection") type, and particularly a protocol of the "Tournament Contention Function" (TCF) type.

According to another aspect of the invention, a multi-station wireless communication system (WiFi) is proposed, utilizing a layer, known as the MAC ("Medium Access Control") layer, provided for implementing a multiple-access protocol and a layer, known as the PHY layer ("Physical Layer"), provided in order to achieve the functions of synchronization and detection, utilizing the method of detection and synchronization according to the invention.

In the present invention, the MAC layer, working together with an intermediate layer given the name of QosWiFi, gives the commands to the PHY layer in order to realize the tournament protocol.

At the request of the MAC layer, the PHY layer generates one or more waveforms (the synchronization signals, the detection signals) which are constituted by 3 timeslots as described in the patent.

Reference is made to the orthogonal or quasi-orthogonal signal s(t), which serves as a basis for constructing the specific waveform x(t): according to our proposal, this waveform is constructed as follows: the cyclic prefix, the quasi-/orthogonal signal, the cyclic suffix for the synchronization signals; a repetition of the signal for the detection signals.

This protocol operates at the level of the MAC layer. The PHY layer is responsible for the detection/synchronization.

BRIEF DESCRIPTION OF THE DRAWINGS

The invention will be better understood with reference to the description corresponding to the figures hereinafter, corresponding to the preferred embodiment of the invention.

DETAILED DESCRIPTION

Figure 1:
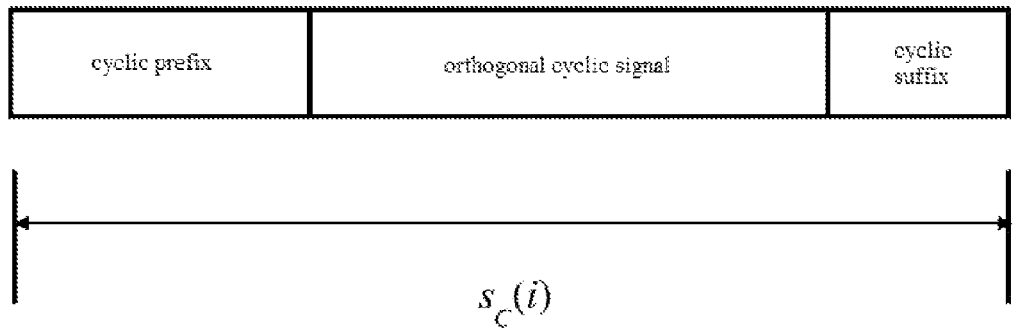
FIG. 1 shows an example of a synchronization signal utilized in the method according to the invention.

Initially, this system is designed to realize the novel protocol given the name TCF, ("Tournament Contention Function"), at the MAC layer level, in WiFi networks. Al the level of the PHY layer ("Physical Layer") intra-cell synchronization and a mechanism for the detection of the presence of a specific waveform are essentials for the success of this type of protocol where access to the radio resources by several users is possible. By optimizing the architecture of the design, this implementation offers rapid and effective waveform detection and more accurate synchronization in time as well as that of the WiFi system.

The set of constant-amplitude waveforms is proposed for the detection and synchronization in WiFi networks. These waveforms are generated by the binary sequences supplied by the PHY layer.

WiFi wireless communication takes place on the PHY layer which provides the support for reliable data transmission and the MAC layer which is responsible for managing the transmission/reception in the context of multi-stations. In the MAC layer, coordination of access to the radio resource is based on the CSMA/CA protocol According to this protocol, when a station needs to send data packets, it listens on the channel for a random duration: if the channel is free, the station sends its frame; otherwise the station waits for the next interval. This mechanism takes account of the fact that each station operates in "half-duplex" mode, i.e. it cannot listen and transmit at the same time. The listening duration is a random multiple of the time interval known as a "timeslot".

The TCF protocol is a multiple-access mechanism known as CSMA/CD ("Carrier Sense Multiple Access with Collision Detection"). Access to the channel is based on the result of a dedicated tournament which is constituted by N exchanges. Before the tournament, each station is equipped with a sequence of N bits $\{b_i\}$ (the key, with i=1.2, ...). During the tournament, at the $i^{th}$ exchange, the station participating in the tournament transmits a waveform (the tournament signal) if $b_i=1$ or listens if $b_i=0$. While listening on the channel, if the station hears (detects) the tournament signal, it is eliminated from the tournament and it adopts listening mode in order to issue echoes. At the end of the tournament, the station which has not detected any tournament signal or has participated in the tournament always with key value 1 ($b_i=1$), is considered to be the winner of the tournament and it will send its data frame in the next available transmission interval.

In order to better manage the tournament, this protocol develops in three phases:

Phase 1 (initialization): phase 1 comprises 3 stages.

Stage 1: in the networks operating under the TCF protocol, a selected station is responsible for initiating the tournament by sending the synchronization signal $S_{sync1}$. All the stations participating in the tournament synchronize in a distributed fashion by listening for $S_{sync1}$.

Stage 2: An echo mode is designed to avoid the problem of "hidden stations". In this stage, the stations configured in "echo" mode will relay the synchronization signal $S_{sync2}$ with which the stations that did not detect $S_{sync1}$ in stage 1 can synchronize.

Stage 3: the stations synchronized with the signal $S_{sync2}$ will send the signal $S_{det3}$ in stage 3 in order to confirm the echo mode. In the event that only $S_{det3}$ is detected, the stations will take part in the tournament in no-echo mode.

Phase 2 (development): after the initialization phase, the stations are considered time-synchronized. The tournament is takes place over N exchanges the duration T of which is constant. In no-echo mode, at the $i^{th}$ exchange the stations having $b_i=1$ (the key) send the signal $S_{det1}$ and those having $b_i=0$ listen on the channel. In echo mode, an exchange is divided into 2 stages and the duration is 2T. In the first stage, the stations behave as if in no-echo mode; in the second stage, the stations having detected $S_{det1}$ send the signal $S_{det2}$ so that the hidden stations can participate in the tournament. In the exchange, if a station in listening mode detects $S_{det1}$ or $S_{det2}$, it loses the tournament but issues an echo $S_{det2}$ at each detection of the signal $S_{det1}$.

Phase 3 (completion): after the exchanges of keys, immediately or after a period of time, the initiating station must send the synchronization signal $S'_{sync1}$ in order to indicate the interval for the winning station to send the packet. The transmission of $S'_{sync1}$ thus targets a resynchronization of the stations under TCF. In echo mode, after the transmission of $S'_{sync1}$ the stations having received $S'_{sync1}$ send $S'_{sync2}$ in order to synchronize the hidden stations before the transmission of the winner while in no-echo mode all stations await this interval of $S'_{sync2}$. For the hidden stations, $S'_{sync2}$ also serves as a synchronization signal.

According to the TCF protocol, the system must be capable of synchronizing with the synchronization signals ($S_{sync1}$, $S_{sync2}$, $S'_{sync1}$ and $S'_{sync2}$) and detecting the detection signals ($S_{det1}$ and $S_{det2}$) at the level of the PHY layer. In the knowledge that $S_{det1}$ and $S_{det2}$ indicate that the channel is busy, it is possible for $S_{det1}$ and $S_{det2}$ to be equal. However, it is noteworthy that the system needs to distinguish $S_{sync1}$, $S_{sync2}$, $S'_{sync1}$ and $S'_{sync2}$ due to the fact that these signals are used for different purposes. Moreover, the total duration of phase 2 is NT (no-echo mode) or 2NT (echo mode) and it is therefore preferable to use short $S_{det1}$/$S_{det2}$ (short T). To this end, it is necessary to refine the time synchronization by sophisticated design of the synchronization signals in order to reduce the guard interval.

It is assumed that during a certain period of time, the transmitting party sends a detect and/or synchronize signal at the time t uniformly distributed within the interval [0,T−1].

The purpose of the synchronization is to find the instant of transmission of the signal. Subject to the condition that the signal has been detected, synchronization merely requires finding the argument t which maximizes the conditional probability density p(y|t) of the received signal y(t):

$$\hat{t} = \underset{t}{\operatorname{argmax}} p(y \mid t) \quad (1)$$

With respect to the ideal signal, the orthogonal cyclic signal is more desirable for constructing a waveform of sufficiently large size.

In the following paragraphs, realization of the system of detection/synchronization of the orthogonal cyclic signal is discussed.

In practice, the realization of channel h(t) is close to a Dirac impulse or a short response which characterizes WiFi channels for indoor applications; the detection/synchronization criterion is approximated by:

$$\text{is } s(t) \text{ transmitted at instant } i? \begin{cases} \text{yes} & \text{if } \|Y(i)\| > \frac{N}{2}\|h\|^2 \\ \text{no} & \text{if } \|Y(i)\| < \frac{N}{2}\|h\|^2 \end{cases} \quad (2)$$

where Y(i) is the signal y(t) filtered by using the appropriate filter.

This criterion is based on the approximation:

$$\|Y(i) - h\sqrt{N}\|^2 \approx \|Y(i)\|^2 - N\|h\|^2 \quad (3)$$

when h(t) comes close to a short impulse.

The simplicity of this approximation is evident: instead of detecting the similarity to the channel realization, the output of the projection is verified with the appropriate filter with respect to the channel power. The channel power is estimated using the orthogonal cyclic signal.

Using the orthogonal cyclic signal makes it possible to design a detection/synchronization system the complexity of which is reduced. In order to realize the TCF protocol in the WiFi system, it is necessary to optimize the waveform in order to simplify the processing steps which minimize the defects of the system. By utilizing the detection/synchronization algorithm using the orthogonal cyclic signal, it is proposed to use a constant-amplitude waveform under BPSK (Binary Phase Shift Keying) modulation for the realization of the TCF protocol.

In the communication system according to the invention, the constant-amplitude waveform makes it possible to minimize the impact of the hardware imperfections, for example the non-linearity of the power amplifier (PA), the RF front end, the digital/analogue converter, etc.

The constant-amplitude waveform is generated by PSK (Phase-Shift Keying) modulation. Moreover, it is preferable to employ BPSK modulation which makes it possible to compensate I/Q mismatch, the mismatch of the In-phase and Quadrature channels. In the existing WiFi system, the I/Q mismatch is estimated and corrected in the dedicated modules which are integrated into the transmission and reception system. Dispensing with the processing of the I/Q mismatch by using the waveform under BPSK modulation therefore makes it possible to accelerate the processing and minimize the impact of the I/Q mismatch.

The pseudo-random binary sequence is employed to generate the orthogonal cyclic signal. If $\{a_n\}$ is the binary sequence of size N, the orthogonal cyclic signal is generated by $$s_n = (-1)^{a_n}, \quad 0 \leq n \leq N-1 \quad (4)$$

Two code families are proposed respectively for the synchronization signals ($S_{sync1}$, $S_{sync2}$, $S'_{sync1}$ and $S'_{sync2}$) and the detection signals ($S_{det1}$ and $S_{det2}$).

For the detection/synchronization, the m-sequence MLS ("Maximum Length Sequence") is chosen, which is generated using the LFSR ("Linear Feedback Shift Register") for a size $N=2^k-1$ where k is the generating primitive polynomial degree. This waveform is employed to construct the signals $S_{sync1}$, $S_{sync2}$, $S'_{sync1}$ and $S'_{sync2}$. In the context of the WiFi system, the base band signal rate is 20 MHz and the following configuration is chosen for the synchronization signals:

1) the size of the cyclic prefix is $N_P=40$ (2 µs);
2) the size of the orthogonal cyclic signal is $N=63$ (3.15 µs);
3) the size of the cyclic suffix is $N_S=12$ (0.6 µs), with reference to FIG. 1.

The cyclic prefix portion also serves to start the automatic gain controller (AGC) which adapts the gain of the radiofrequency (RF) system to the power of the received signal. Comsis have developed a rapid algorithm for carrying out this AGC procedure. In practice, this procedure terminates at around 1 µs, supplying an adaptation optimized at the power level comprised between −75 dBm and −30 dBm. For the weak signal with a level below −75 dBm, this algorithm delivers a suitable gain more rapidly, in less than 1 µs. The signal configuration takes account of the characteristics of the WiFi channel in the indoor environment where the channel pulse is very short with RMS ("Root Mean Square")= 0.25 µs. The length of the cyclic prefix is sufficiently great to cover the AGC procedure and the multi-path spread of the channel. Once the AGC is established, the detection/synchronization procedure is initiated until the end of the cyclic suffix is reached.

Figure 2:
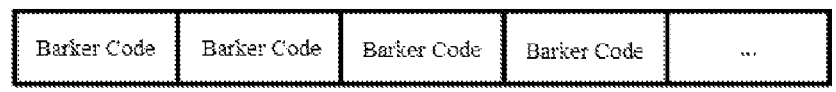
FIG. 2 shows an example of a detection signal utilized in the method according to the invention.

For the detection signals, $S_{det1}$, $S_{det2}$ and $S_{det3}$, it is proposed to construct a waveform which is a repetition of the orthogonal cyclic signal. It is sufficient to choose the short orthogonal cyclic signal, for example, the signal $S_{det1}$/$S_{det2}$ is generated by the repetition of the Barker-7 code, and the signal $S_{det3}$ is generated by the repetition of the Barker-13 code, such as shown in FIG. 2.

The detection of the signals $S_{det1}$, $S_{det2}$ and $S_{det3}$ can be carried out by using the same detection/synchronization architecture as for the synchronization signal.

The invention claimed is:

1. A method of synchronization and detection for a multi-station wireless communication system (WiFi), the method comprising:
   providing a wireless communication network including a plurality of stations;
   providing a Medium Access Control (MAC) layer that is configured for managing transmission and reception of data packets between the plurality of stations, and implementing a multiple access protocol;
   providing a Physical Layer known as Physical (PHY) layer that is configured for synchronizing and detecting a presence of a specific waveform;
   transmitting commands from the MAC layer to the PHY layer for realizing said multiple-access protocol;
   generating at least one waveform by the PHY layer in response to the commands received from the MAC layer, said at least one waveform carrying synchronization signals and detection signals between the plurality of stations of the multi-station wireless communication system, utilizing one of an orthogonal or quasi-orthogonal cyclic signal for constructing said at least one waveform.

2. The method according to claim 1, wherein the synchronization signals include a cyclic prefix, the orthogonal or quasi-orthogonal cyclic signal and a cyclic suffix.

3. The method according to claim 1, wherein the detection signals include a repetition of the orthogonal or quasi-orthogonal cyclic signal.

4. The method according to claim 3, wherein the detection signals are generated by a repetition of Barker codes.

5. The method according to claim 1, wherein the at least one waveform has a substantially constant amplitude.

6. The method according to claim 5, wherein the at least one waveform is generated by Phase Shift Keying modulation.

7. The method according to claim 6, wherein the at least one waveform is generated by Binary Phase Shift Keying modulation.

8. The method according to claim 1, wherein the orthogonal or quasi-orthogonal cyclic signal is generated from a pseudo-random binary sequence according to $$s_n = (-1)^{a_n}, 0 \leq n \leq N-1$$

where $\{a_n\}$ is a binary sequence of size N.

9. The method according to claim 1, wherein the at least one waveform is generated by using an m-sequence, i.e. a periodic sequence of values produced by a linear feedback shift register.

10. The method according to claim 2, wherein the cyclic prefix is arranged to command an automatic gain controller.

11. The method according to claim 1, further comprising utilizing an intermediate layer provided to work together with the MAC layer for transmitting commands to the PHY layer.

12. The method according to claim 1, wherein the orthogonal or quasi-orthogonal signal is of the type $$\bar{s} = (s_0, \ldots, s_{N-1})$$

having a length N which verifies:

$$\begin{cases} E(\bar{s}) = \frac{1}{N} \sum_{i=0}^{N-1} s_i = \epsilon \\ A(\bar{s}, t) = \frac{1}{N} \sum_{i=0}^{N-1} s_i s_{i+t}^* = f(t) \end{cases}$$

where E is the expected value of the signal and A ($\bar{s}$, t) is the autocorrelation function of the signal and $$\epsilon = 0 \text{ or } \epsilon \approx 0 \text{ and } f = \delta \text{ or } f \approx \delta$$

where δ is a Dirac impulse such that $$\delta(t) = \begin{cases} 1, & t = 0 \\ 0, & t \neq 0 \end{cases}.$$

13. The method according to claim 1, utilized in order to implement a multiple-access mechanism of the Carrier Sense Multiple Access with Collision Detection type.

14. The method according to claim 13, utilized for implementing a protocol of the Tournament Contention Function type.

* * * * *